US006829599B2

(12) United States Patent
Chidlovskii (10) Patent No.: US 6,829,599 B2
(45) Date of Patent: Dec. 7, 2004

(54) SYSTEM AND METHOD FOR IMPROVING ANSWER RELEVANCE IN META-SEARCH ENGINES

(75) Inventor: Boris Chidlovskii, Meylan (FR)

(73) Assignee: Xerox Corporation, Stamford, CT (US)

(*) Notice: Subject to any disclaimer, the term of this patent is extended or adjusted under 35 U.S.C. 154(b) by 190 days.

(21) Appl. No.: 10/262,614

(22) Filed: Oct. 2, 2002

(65) Prior Publication Data

US 2004/0068486 A1 Apr. 8, 2004

(51) Int. Cl.⁷ .............................................. G06F 17/30
(52) U.S. Cl. ..................... 707/3; 707/2; 707/6; 707/10; 707/101
(58) Field of Search ............................ 707/3, 2, 6, 10, 707/101

(56) References Cited

U.S. PATENT DOCUMENTS

| | | | | |
|---|---|---|---|---|
| 5,321,833 | A | 6/1994 | Chang et al. ............... | 395/364 |
| 5,765,149 | A | 6/1998 | Burrows ..................... | 707/395 |
| 5,765,150 | A | 6/1998 | Burrows ..................... | 707/395 |
| 5,826,260 | A | 10/1998 | Byrd, Jr. et al. ............ | 707/395 |
| 5,826,261 | A | 10/1998 | Spencer ...................... | 707/707 |
| 5,870,740 | A | 2/1999 | Rose et al. ................. | 707/707 |
| 5,893,092 | A | 4/1999 | Driscoll ..................... | 707/707 |
| 5,907,841 | A | 5/1999 | Sumita et al. .............. | 707/395 |
| 5,924,090 | A | * 7/1999 | Krellenstein .................... | 707/5 |
| 6,085,186 | A | * 7/2000 | Christianson et al. .......... | 707/3 |
| 6,102,969 | A | * 8/2000 | Christianson et al. ....... | 717/146 |
| 6,327,590 | B1 | 12/2001 | Chidlovskii et al. ........ | 707/707 |
| 6,385,602 | B1 | * 5/2002 | Tso et al. ...................... | 707/3 |

OTHER PUBLICATIONS

Gaussier et al., "A hierarchical model for clustering and categorising document", Lecture Notes in computer Science, No. 2291, p. 229–247, 2002.*

Hull et al., Document routing as statistical classification, In AAAI Spring Symposium on Machine Learning in Information Access, Palo Alto, CA, Mar. 2002.*

Zamir et al., "Gouper: adynamic clustering interface to web search results", Computer networks–the international journal of computer and Telecommunications Networking, vol. 31, No. 11, p. 1361–1374.*

J.–M. Andreoli, U. Borghoff, P.–Y. Chevalier, B. Chidlovskii, R. Pareschi, and J. Willamowski, "The Constraint–Based Knowledge Broker System", in Proc. of the 13th Int'l Conf. on Data Engineering, Apr. 7–11, 1997, Birmingham, U.K.

D. Angluin, "Queries and Concept Learning", in Machine Learning. vol. 2, pp 319–342, 1988.

B. Chidlovskii, and U. Borghoff, "Query Translation for Distributed Information Gathering on the Web", in Proc. of the Int'l Database Engineering and Applications Symposium, Jul., 1998, UK.

(List continued on next page.)

Primary Examiner—Jean M. Corrielus
(74) Attorney, Agent, or Firm—Oliff & Berridge, PLC (57) ABSTRACT

A user of a meta-search engine submits a query formulated with operators defining relationships between keywords. Information sources are selected for interrogation by the user or by the meta-search engine. If necessary, the query is translated for each selected source to adapt the operators of the query to a form accepted by that source. The query is submitted to each selected source and answers are retrieved from each source as a summary of each document found that satisfies the query. The answers are post-filtered from each source to determine if the answers satisfy the originally formulated query. Answers that satisfy the query are displayed as a list of selectable document summaries. The analysis includes computing a subsumption ratio of filtered answers to answers received that satisfy a translated query. The subsumption ratio is used to improve the accuracy of subsequent queries submitted by the user to the meta-search engine.

21 Claims, 7 Drawing Sheets

OTHER PUBLICATIONS

W. Cooper, "Getting Beyond Boole", in K.Spark Jones, P.Willett, Readings in Information Retrieval, pp. 265–267, 1997.

L. Gravano, and Y. Papakonstantinou, "Mediating and Metasearching on the Internet", in Data Engineering Bulletin 21(2): 28–36, 1998.

L. Gravano, and H. Garcia–Molina, "Merging Ranks from Heterogeneous Internet Sources", in Proc. VLDB 1997: 196–205.

S. Lawrence, and L. Giles, "Content and Page Analysis for Improved Web Search", in IEEE Internet Computing, 2(4): 38–46, 1998.

T. Mitchell, "Concept Learning And The General–To–Specific Ordering", Chapter 2 of Machine Learning, pp. 20–51, McGraw Hill Companies, Inc., 1997.

T. Mitchell, "Learning Sets Of Rules", Chapter 10 of Machine Learning, pp. 274–306, McGraw Hill Companies, Inc., 1997.

G. Salton, A. Wong, and C. S. Yang, "A Vector Space Model for Automatic Indexing", in K.Spark Jones, P.Willett, Readings in Information Retrieval, pp. 273–280, 1997.

* cited by examiner

SYSTEM AND METHOD FOR IMPROVING ANSWER RELEVANCE IN META-SEARCH ENGINES

BACKGROUND OF INVENTION

The present invention relates generally to the field of computer-based information retrieval, and in particular to the field of search engines that facilitate access to data published on the Internet and intranets, specifically meta-search engines that exploit other information sources in order to provide a better answer to user queries.

Web search engines have facilitated the access to data published on the Internet and intranets. However, individual search engines are subject to certain limitations, and this has resulted in the design of meta-searchers that exploit other information sources (including those on the Web) in order to provide a better answer to user queries. Meta-searchers do not have their own document collections; instead, they forward user queries to external information sources in order to retrieve relevant data. They "wrap" the functionality of information sources and employ the corresponding wrappers for interaction with the remote sources.

In ordinary search engines user relevance feedback mechanisms exist, but these mechanisms assume full access to document content. However, a meta-searcher typically only receives brief document descriptions, but not the full content of documents.

In fact, certain conventional information sources (such as Library of Congress, ACM Digital Library, AltaVista, etc.) offer a "Find similar items" feature, when the user, after sending a conventional query, can request for all items "similar" to a given one, selected by the user from the query answer list. Generally, the selected document is used by the source to query its internal document collection. Finding similar documents in the collection is straightforward, as the source contains full descriptions of documents and implements conventional methods for evaluating the relevance ("distance") between the given document and any other.

Unfortunately, this is not true for the meta-searcher, which, as explained, only receives a short summary of each document. Two immediate solutions are possible: full document retrieval and using similarity features of sources. In the first solution, the meta-searcher can retrieve all documents listed in the sources' answers, analyze and re-rank them "from scratch". However, the document downloading takes time and therefore the complete re-ranking cannot be fulfilled on-line. In the second solution, the meta-searcher can profit from "Find similar items" features of information sources by forwarding selected documents, but it can work successfully only if most sources provide such a service. Because only few existing Web sources are adapted to search for similar documents, the majority of existing meta-searchers, such as SavvySearch (www.search.com) simply report the sources' ranks. Some others, such as MetaCrawler (www.metacrawler.com), do allow for a certain similar document search, but the "more like this" action will in fact be that of the source providing the document if that source is capable of providing such service.

Further, in meta-search engines, answers to a user query are retrieved from different information sources, but the sources' heterogeneity disallows the direct reuse of ranking or scoring information given by these sources. Thus, one of the important issues with the meta-searching is the ranking of documents received from different sources. The number of documents relevant to a user query at one information source is often large and the sources rank documents by using different ranking methods, these methods are often protected and hidden from users, thus also from the interrogating meta-searcher. As a result, meta-searchers have difficulty unifying sources' ranks and providing a final and unique ranking of answers delivered to the user.

Another problem is to give a user a high(er) satisfaction from the query answers. When formulating precise queries with an individual search engine, an experienced user can benefit from the features of the source's query language, including the attribute search, Boolean constraints, proximity operators, etc. However, even for a well-prepared query, hundreds of documents may fit the query so that, to get satisfactory results, the user query often undergoes multiple refinements.

The situation becomes more complicated in a meta-searcher, where certain important aspects of the meta-searching are purposely hidden from users: which information sources are contacted for querying, how initial queries are translated into native queries, how many items are extracted from each source, how to filter out items that do not fit the user query. All this makes the relationship between a query and the answers less obvious and thus makes the query refinement more cumbersome for the user. Since all this knowledge is encoded in different steps of the query processing, it becomes a challenge for the meta-searcher to help the user in query reformulation and in getting the most relevant answers.

A user can provide feedback on a search query result, for example by selecting and unselecting documents listed in the query answer. When a user selects relevant documents from the answer list, the meta-searcher could use a simple solution by sending the selected document as a query to an information source for querying and retrieval, but this is true only when the source uses the vector-space model (VSM). In the VSM, the relevance of a similar document is determined by comparing certain document parameters and weighting the result so as to determine a vector distance of the selected document to another one. In short, in the VSM, documents are represented as a vector of keywords. Each element in a vector will have a weight on a continuous scale. A typical approach is to take a document and process it until a list of unique words remains. This list, which contains all words in the document, is filtered through an algorithm that removes words that are too common to be searched, e.g., words like "the", "of" and "a" are routinely filtered out. The remaining list of words is then depicted as a vector space, where each word represents a dimension. The length of the vector can be determined in a number of ways, ranging from basic algorithms which make the vector longer if a number of words occurs more often, to complex ones that take into account term frequency and inverse document frequency measures.

However, modern search engines generally use the VSM in web systems using the information retrieval technology, but a different model is used in web systems querying data in databases. This different model, called the enhanced Boolean model (EBM), where all documents in the collection, whether they satisfy the Boolean query or not, are ranked by a relevance score. In a Boolean model, documents are represented as a set. In a Boolean model set, a document is indexed by assigning a number of keywords. When a user submits a query, a similarity function will try to match the query with all documents in the index. In a strict Boolean model the similarity function will only return documents that exactly match the query given by the user. That is why most search engines use the enhanced Boolean model, which is less restrictive as it will return a list of documents that match according to a similarity percentage. No distance is determined, as there merely exists a list of ranked documents; a document with a higher ranking does then not necessarily mean that its contents is similar to that of the selected document.

Further, if the enhanced Boolean model were to be used, it could be possible to adopt the schema of learning classical Boolean queries. In machine learning, monotone Boolean queries can be efficiently learned in the polynomial time. However, assumptions imposed by the theoretical learning mechanism turn out to be too strong in the real querying, where the user cannot be forced to give feedback on each answer document or to be prohibited from altering the relevance marks on documents in successive refinements. Formally, it means the learning should use the user relevance feedback that can be both incomplete and contradictory. As may be readily understood, all existing standard learning schemas turn inefficient in such a setting.

Another possibility would be to rank documents based on a user profile, either defined statically as a set of keywords or extracted from another environment the user is working in, for example, in a multiple user-shared recommendation system like Knowledge Pump, which is described in "Making Recommender Systems Work for Organizations" by Natalie S. Glance, Damián Arregui and Manfred Dardenne, Proceedings of PAAM, 1999. However, this solution is limited compared to the other above-mentioned possibilities when learning from successive query refinements.

It would therefore be advantageous to at least partly overcome the above-mentioned problems and to provide a method for improving the answer relevance in meta-search engines by using query analysis. It would further be advantageous to improve the answer relevance by also using user feedback analysis.

SUMMARY OF INVENTION

In accordance with one aspect of the invention, there is provided a method and apparatus therefor for improving search results from a meta-search engine that queries information sources containing document collections. Initially an original query is received with user selected keywords and user selected operators. The user selected operators define relationships between the user selected keywords. A set of information sources is identified to be interrogated using the original query by performing one of: (a) receiving a set of user selected information sources, (b) automatically identifying a set of information sources, and (c) performing a combination of (a) and (b). The set of information sources identifies two or more information sources. At least one of the user selected operators of the original query that is not supported by one of the information sources in the set of information sources is translated to an alternate operator that is supported by the one of the information sources in the set of information sources. A selected one of the translated queries and the original query is submitted to each information source in the set of information sources. Answers are received from each information source for the query submitted thereto. Each set of answers received from each information source that satisfy one of the translated queries is filtered by removing the answers that do not satisfy the original query. For each filtered set of answers, a subsumption ratio of the number of filtered answers that satisfy the original query to the number of answers that satisfy the translated query is computed. Each computed subsumption ratio is used to perform one of: (d) reformulating a translated query; (e) modifying information sources in the set of information sources automatically identified at (b); and (f) performing a combination of (d) and (e).

BRIEF DESCRIPTION OF THE DRAWINGS

These and other aspects of the invention will become apparent from the following description read in conjunction with the accompanying drawings wherein the same reference numerals have been applied to like parts and in which.

DETAILED DESCRIPTION OF INVENTION

A. Operating Environment and Operational Overview

Figure 1A:
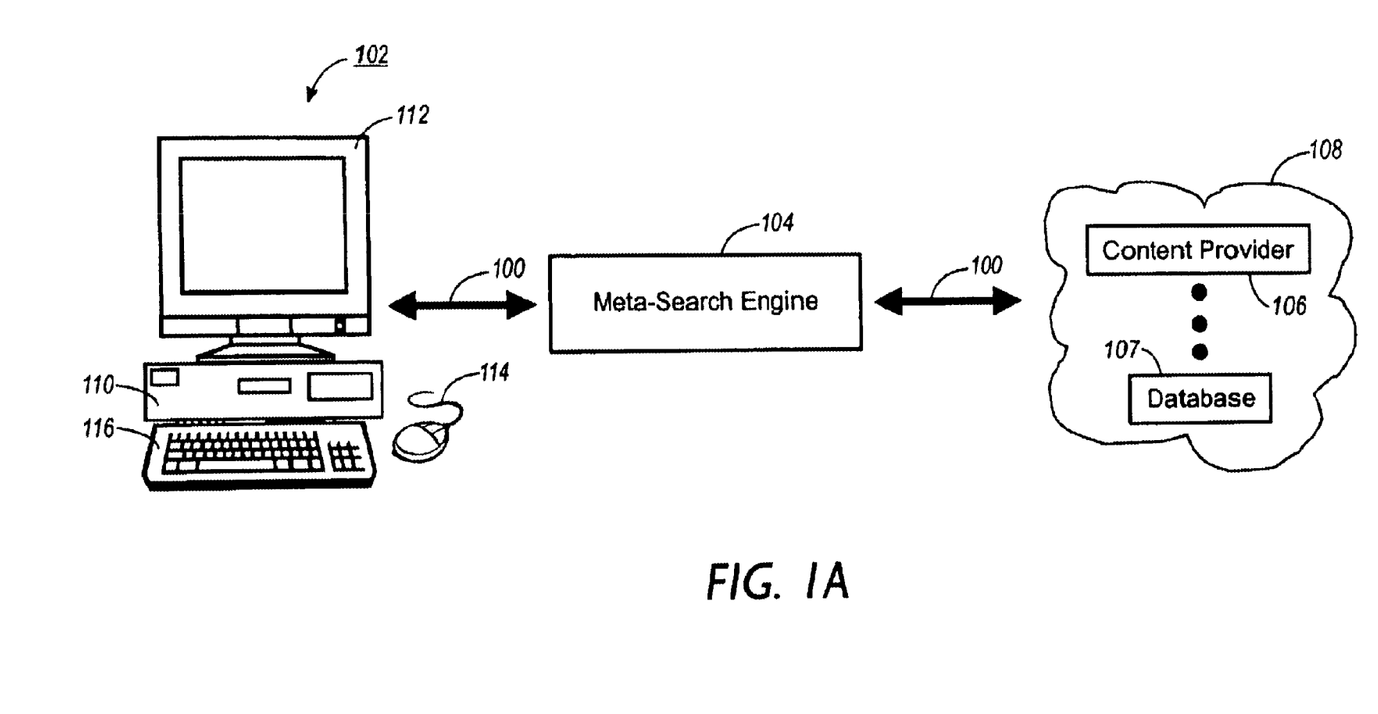
FIG. 1A illustrates an operating environment for performing the present invention.

FIG. 1A illustrates an example of an operating environment for performing the present invention. In the operating environment, a network 100, such as the Internet or an intranet, operatively couples at least one user computer 102, a meta-search engine 104, and a plurality of content providers 106 and/or databases 107 (generally referred to herein as information sources 108). The user computer 102 includes a processing unit 110, display 112, pointing device 114, and keyboard 116.

Figure 1B:
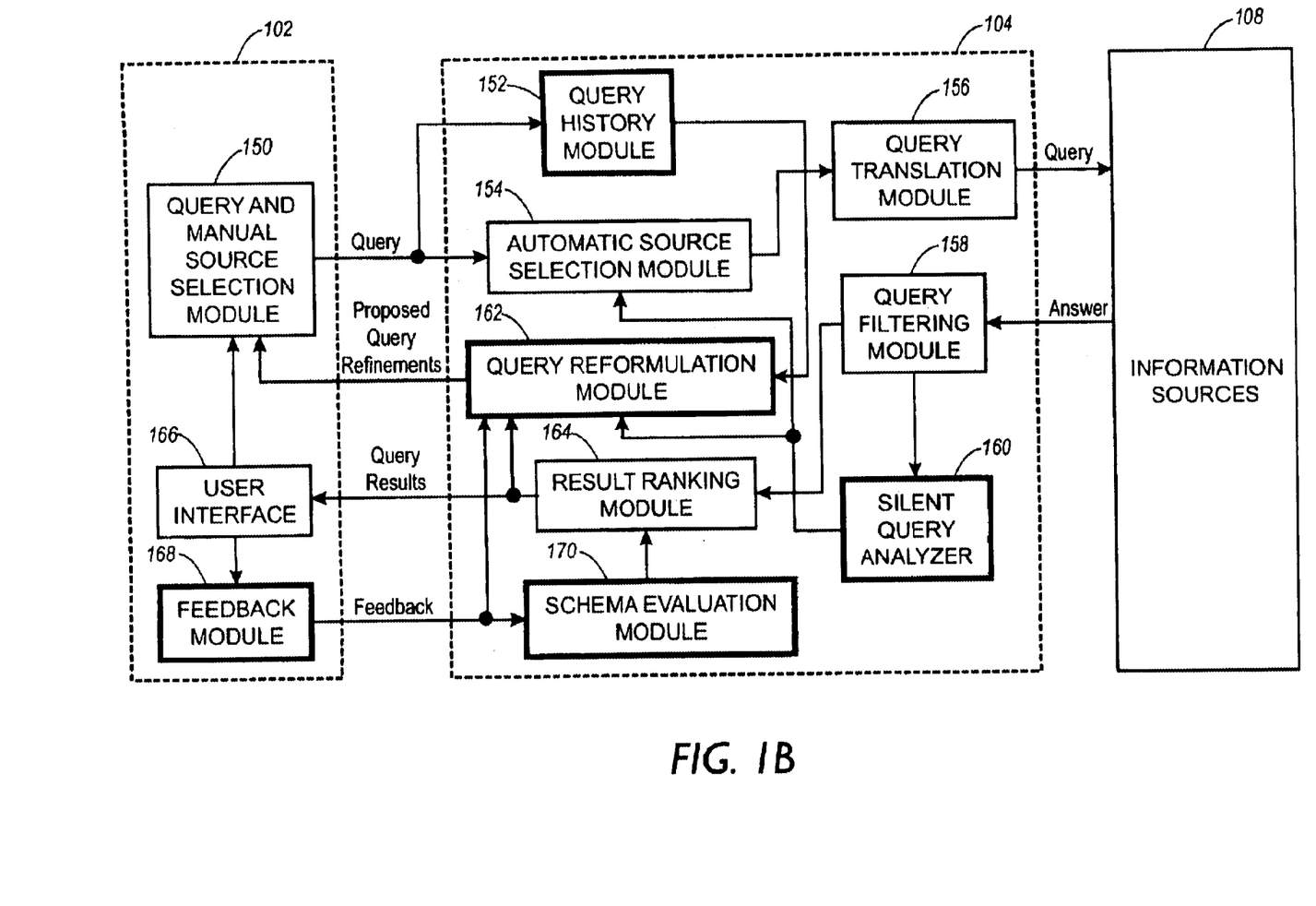
FIG. 1B illustrates a detailed block diagram of the components for carrying out the present invention forming part of the operating environment shown in FIG. 1A.
Figure 2:
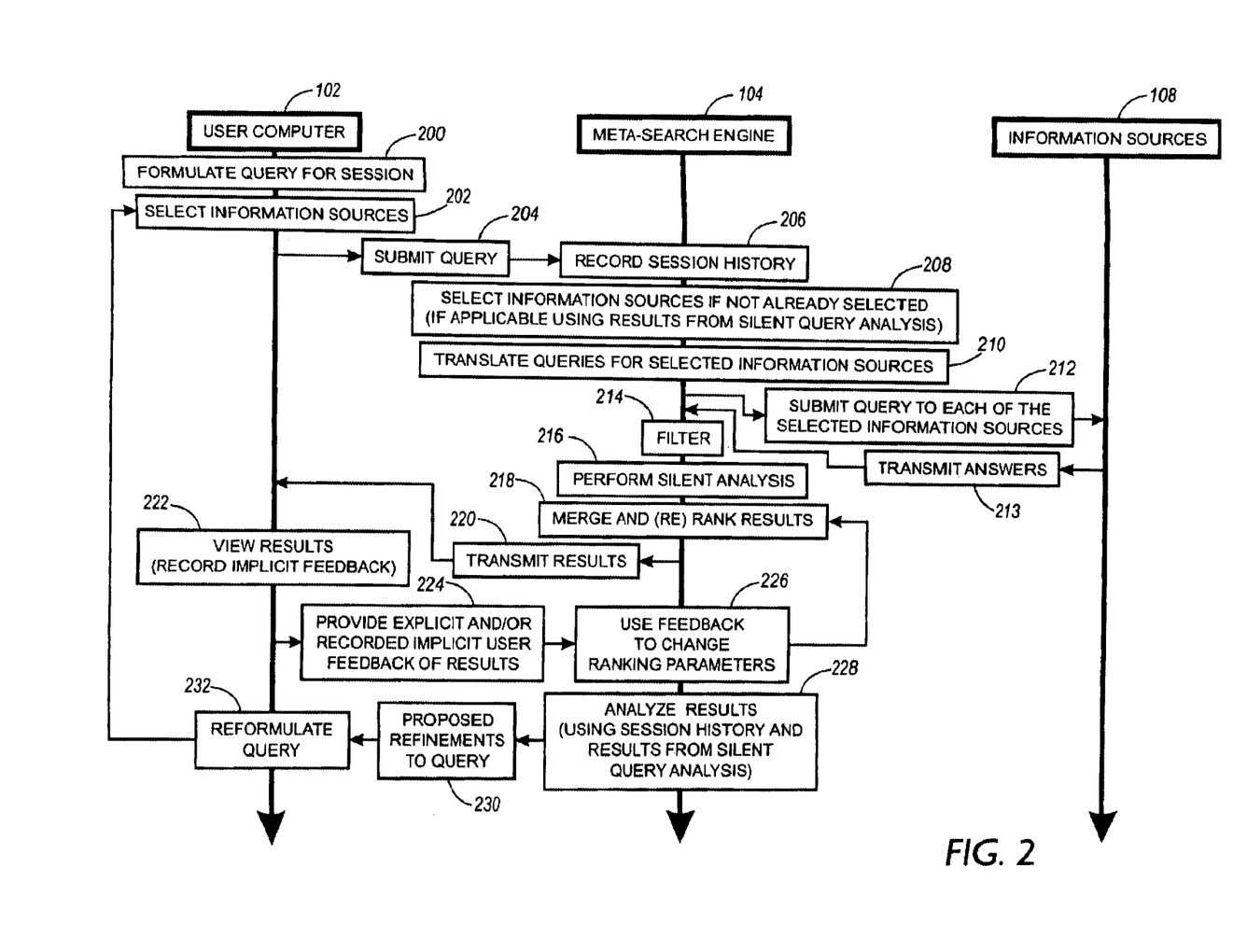
FIG. 2 is a flow diagram setting forth the interaction of elements in the operating environment shown in FIG. 1B.

FIG. 1B illustrates a detailed block diagram of the components for carrying out the present invention forming part of the operating environment shown in FIG. 1A. FIG. 2 is a flow diagram setting forth the interaction of elements in the operating environment shown in FIG. 1B. FIG. 1B and FIG. 2 will be described below while simultaneously referring to elements in each Figure.

Initially, the user of the user computer 102 formulates a query for a session (i.e., a query session) (at 200 in FIG. 2 using module 150 in FIG. 1B). During query formulation a user composes, in a known manner, a search query by entering keywords and operators defining relationships between the keywords. For example, a user may type the words "red" and "frogs" together with a Boolean operator such as "AND". In this example, the search that will be carried out relates to all documents containing both the words "red" and "frogs".

In some embodiments the meta-search engine may allow a user to select which information sources are to be interrogated (at 202 in FIG. 2 using module 150 in FIG. 1B). In other embodiments, the meta-search engine 104 may be preprogrammed to select information sources depending on, for example, the entered keywords (at 208 in FIG. 2 using an automatic source selection module 154 in FIG. 1B). For instance, certain keywords could imply a specific field, so that specialized information sources may be selected to ensure a certain answer relevance of the query.

Thus, depending on the capabilities of the meta-search engine 104, if the user knows which information sources sought to be queried, the user may select those for the query (at 202 in FIG. 2 using module 150 in FIG. 1B). In response to submission of the query (at 204 in FIG. 2) from the user computer 102, the meta-search engine 104 begins recording a session history (at 206 in FIG. 2 using module 152 in FIG. 1B). The session history is used for learning reformulations made to the query (at 228 in FIG. 2 using query reformulation module 162 in FIG. 1B) to automatically propose refinements of the query (at 230 in FIG. 2) to the user computer 102, the details of which are discussed below.

Depending on the information sources selected for the query, the meta-search engine 104 may select (or add) information sources (at 208 in FIG. 2 using module 154 in FIG. 1B) to which the query should be submitted. For each of the selected information sources (at 202 and/or 208 in FIG. 2), a query translation module 156 (in FIG. 1B) translates (at 210 in FIG. 2) the query (i.e., converts the query into a target query language appropriate for each information source) and performs subsumption if necessary on the query for each of the selected information sources (at 202 or 208 in FIG. 2), the details of which are discussed below. Once translated, the query is submitted to each of the selected information sources 108 using wrappers, which can control data flow from the information sources.

In response to each query it submits to an information source (at 212 in FIG. 2), the meta-search engine 104 receives summaries of documents considered relevant (at 213 in FIG. 2). Generally, the meta-search engine 104 does not have any documents available (although it may have some in limited situations), but instead interrogates independent information sources 108 to find answers to a submitted search query using wrappers, which know the appropriate manner/format to query each information source.

All of the individual results (received at 213 in FIG. 2) from the queried information sources are filtered to eliminate documents that do not satisfy the original meta-search query (at 214 in FIG. 2 using module 158 in FIG. 1B). Subsequently these filtered results are merged and ranked to produce composite results of the query (at 218 in FIG. 2 using module 164 in FIG. 1B) that are transmitted to the user computer 102 (at 220 in FIG. 2).

To improve the relevance of answers received from the information sources 108 that are provided to the user computer 102 by the meta-search engine 104, the composite results are analyzed (at 216 in FIG. 2 by a silent query analyzer 160 in FIG. 1B). The results of the silent query analyzer 160 are provided to a query reformulation module 162 and to the automatic source selection module 154 to improve query formulation.

Automatically and/or depending on the accuracy of the results viewed on user interface 166 (at 222 in FIG. 2), a user may choose to either provide implicit and/or explicit user feedback of the results (received at 220) to the meta-search engine 104 (at 224 in FIG. 2 using module 168). The explicit and/or implicit user feedback is analyzed and used to change ranking parameters (at 226 in FIG. 2 using schema evaluation module 170 in FIG. 1B).

The recorded differences between previous queries reformulated queries (at 206 in FIG. 2) and/or results from the silent query analyzer 160 may be used to further analyze results and propose refinements to the query (at 228 and 230 in FIG. 2 using the query reformulation module 162 in FIG. 1B). The proposed refinements to the query may be used by a user to reformulate the query (at 232 in FIG. 2).

Details of this process are now described below.

B. Query Translation

Once the query is formulated (at 200) and information sources selected (at 202 and/or 208), it is then necessary to translate the query (at 210) for each of the selected information sources so as to adapt the operators of the meta-search query to the form accepted by each individual information source because certain information sources may not accept specific operators. For each information source chosen for the query, the query translation module 156 thus translates, if necessary, the meta-search query into a form accepted by each of the selected information sources.

When the query language of a selected information source does not support certain features of the meta-search engine query language, a subsumption of non-supported operators is required. Generally, a subsumption of a non-supported operator is performed by replacing the non-supported operator by a set of one or more supported operators (i.e., operators supported by the selected information source) that will provide at least the same set of answers as the non-supported operator, thereby subsuming the non-supported operator. For example, if an information source does not support a query with phrases, each phrase is replaced with a Boolean AND over all terms composing the phrase.

C. Obtain, Merge, and Rank Results

After any necessary translation is performed, each information source is queried (at 212). Answers received from each information source (at 213) may contain documents that do not satisfy the original query. This may be due to query translation and subsumption of certain operators. The results are therefore filtered to eliminate documents that do not satisfy the original meta-search query (at 214) and analyzed (at 216, 226 and 228).

D. Analyze Results

Depending on the meta-search engine, different levels of analysis may be performed (at 216 and 228). At a first level, the analysis is silent (i.e., performed without user input—explicit or implicit) (at 216). At a second level, the analysis is verbose (i.e., with user input—explicit or implicit) (at 226). Each of these levels may or may not involve re-querying of the information sources. That is, in some instances, results may be able to be re-ranked and filtered (at 226 and 218) without necessitating additional information from the information sources. Alternatively, results may be re-ranked and filtered after reformulating the query (at 232).

D.1 Silent Query Analysis (Without Using User Feedback)

Silent query analysis of the results (at 216) is performed by evaluating the number of filtered answers as compared to the number of answers received from the information source(s). The same analysis can be performed for all of the selected sources by summing the answers. It is called silent query analysis because no feedback from the user is required to improve the answer relevance of the query. Thus, even without user feedback, this silent query analysis provides improvements to the answer relevance of the query.

Two embodiments of silent query analysis are presented below. In either embodiment, each operator subsumption can be characterized by a corresponding operator subsumption ratio "r". If an operator, referenced by the reference sign "O", in meta-search query "Q" is subsumed with an operator "O'" that is considered to be understood by the selected source, and from the answer S' on query Q' returned by the selected source only a subset S remains after the post-filtering step, then in a first embodiment an operator subsumption ratio can be defined as follows:

$$r(O,O')=|S|/|S'|.$$

In this first embodiment, the operator subsumption ratio $r(O,O')$ can be evaluated as a mean over a sequence of subsumptions of the operator O. The operator subsumption ratio $r(O,O')$ takes values from the [0,1] interval. The lower the operator subsumption ratio r(O,O') is, the worse the operator O' appears to be for subsuming the operator O. Thus, subsumption analysis permits the definition of a certain threshold of the operator subsumption ratio below which a different subsumption operator should not be used or reformulated in a subsequent search on the selected source.

In a second embodiment, a query subsumption ratio r(Q) can be defined as follows for the entire query Q that contains a set of operators $O_1, O_2, \ldots O_n$ (i.e., for a summation of the answers from all the selected sources):

$$r(Q)=\Sigma|S|/|S'|.$$

Similar to the operator subsumption ratio r(O,O'), if a query subsumption ratio r(Q) falls below a predetermined threshold value, the entire search query should be reconsidered so as to reformulate it in order to improve the search answers in a subsequent search query. Thus, a low query subsumption ratio r(Q) for query Q means that a large part of documents received from information sources were filtered out and/or down-weighted before being transmitted to the user.

In either embodiment, the subsumption ratios may provide an immediate indication for a user or the system to modify the query in order to avoid a low query subsumption ratio. In one embodiment, the meta-search engine can analyze all operators O in query Q and detect the one(s) contributing the most to the low query subsumption ratio r(Q) (at silent query analyzer 160) and determine how to modify those accordingly (at query reformulation module 162). Alternatively, the query reformulation module 162 can rank the proposed modifications in the order of their importance and/or influence based on the query subsumption ratio r(Q).

In yet another embodiment, the automatic source selection module 154 receives as input subsumption ratios from the silent query analyzer 160 and uses the subsumption ratios to rank or re-rank the importance of information sources that it uses for performing automatic source selection. For example, if the operator subsumption ratio is equal to one, then the automatic source selection module 154 may increase the value and/or importance of the information source queried for use in future automatic source selection.

D.2 Analysis Using User Feedback

The results of a query can be further improved if user feedback, both explicit and implicit, is also taken into consideration to improve the query results. User feedback is explicitly provided or implicitly recorded by the feedback module 168 (at 222) and transmitted from the user computer 102 to the meta-search engine 104 (at 224). As described below, the feedback is used by the schema evaluation module 170 to change ranking parameters used by the result ranking module 164 (at 226).

In one embodiment, the user feedback analysis can be applied independent from the silent query analysis to improve query results. In another embodiment, because users generally do not like putting to much effort in providing feedback on query answers, a combination of silent query analysis and user feedback analysis is preferred to improve overall results.

D.2.1 Explicit User Feedback

Figure 3:
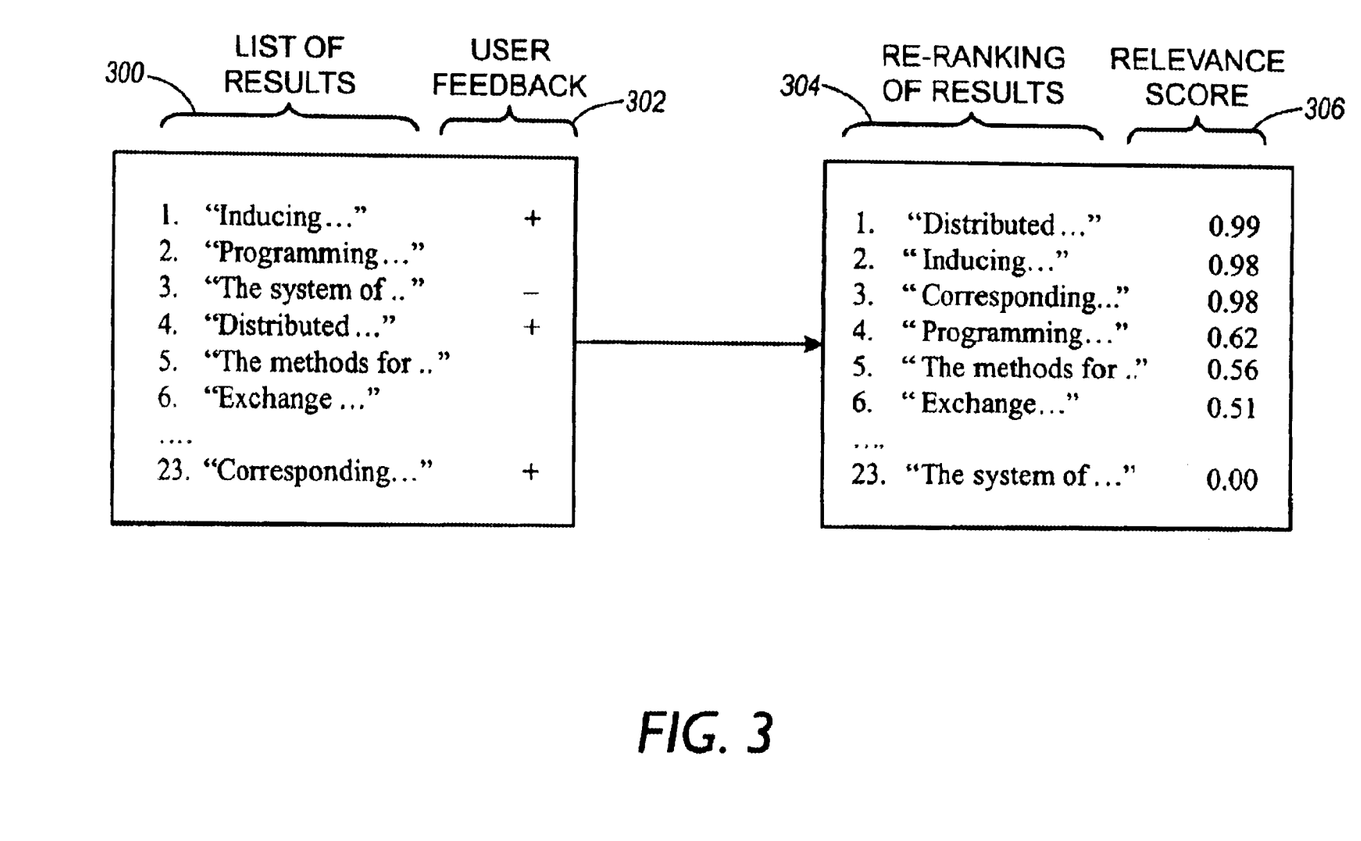
FIG. 3 illustrates an example of a query answer re-ranking without querying by using user relevance feedback.

Explicit user feedback involves receiving information specifically directed at the query from the user. For instance, a user, when browsing through the answer list (i.e., results) of the original query at the user interface 166, can select relevant and unselect irrelevant documents on the list to provide positive and negative feedback, respectively. Then, the marked documents may be used for query refinement and the system can induce how to modify the original query in order to get more precise answers. For example as shown in FIG. 3, a user may provide feedback 302 for a document in a list of results 300 that is positive using a "+" sign and that is negative feedback using a "−" sign.

D.2.2 Implicit User Feedback and User Profiling

Besides explicit user feedback, it is also possible to record and analyze implicit user feedback. The user computer 102 can provide to the meta-search engine 104 implicit user feedback by observing and analyzing the user's actions on query answers at the user interface 166 and induce what the user is searching for. This implicit user feedback can then be used to evaluate the list of results shown in FIG. 3 in a similar manner to the explicit user feedback provided by a user.

For example, by analyzing user actions such as printing or visiting certain documents from the answer list, the user computer and/or the meta-search engine may determine that such actions should be considered positive feedback from a user about entries in the answer list. The meta-search engine 104 can also correlate documents visited and/or printed by the user with initial or reformulated queries using session information recorded by the query history module 152.

However, users have personal habits that can influence this implicit feedback analysis. For instance, certain users like visiting all documents listed in an answer list. Thus, to improve reliability of the implicit feedback analysis, it is preferable that the system be capable of distinguishing between pertinent user's interests and personal habits of working with documents. If a user systematically visits all answers or picks them randomly, the threshold mechanism can detect the low relevance between user interaction and user's interests expressed in queries.

For tracing and separating user's interests from user's habits, Bayesian network evaluation methods may be used. Two probabilities $P(d/Q)$ and $P(d/Q_{revised})$ will evaluate the probability that a given document "d" is relevant to the initial query Q and to the revised query $Q_{revised}$. A standard Bayesian Network Evaluation (BNE) method may be used to rank documents with respect to any of the two queries. It will be appreciated however that the BNE method may require a lengthy learning period and its reliable use will require an essential starting phase of collecting explicit user feedback.

To reduce the learning overhead, the BNE method can be complemented with classifications of users by their profile. In fact, any user can be classified into a specific class defined by his or her static profiles, such as sex, age, profession and queries submitted over the previous session(s). This knowledge can be used to help rank queries when the BNE method is not applicable.

The information captured over the user search session represents current, pertinent user interests and can be reused for subsequent search sessions. Stored as a profile, this information contains the user preferences in the form of information sources most frequently appreciated (positive feedback) by the user, keywords from the positive and negative user feedback, and the correlation ratio between queries proposed to a user by the system and his or her query choice.

A profile can thus include three components: a static profile (e.g., sex, age, profession), a domain profile (e.g., interest domains and preferred information sources) and a query profile. While the first component remains stable for a long period of time, the second and third components can change quickly with time. The information sources preferred by the user, as well as query types and the operation subsumption history allow further improvement of the refinement of user queries. Moreover, because of query subsumption, the query profile is dependent on the domain profile and each item of the query profile is associated with the corresponding item of the domain profile.

D.2.3 Re-Ranking Without Query Refinement

In one embodiment, the user relevance feedback is used to re-rank documents in the answer list, without re-querying the information sources (at 226 and 218). Thus, after such re-ranking, all selected documents will appear at the beginning of the re-ranked list of results, with all unselected documents appearing at the end of list. In addition, all other non-marked documents will be ranked by their distance to the selected and unselected documents.

The following method for ranking a list of results requires that at least one document is selected by a user. Each document, indicated here by general reference "d", viewed in the answer list is represented as a set of parameter pairs, a first parameter "attribute", and a second parameter "value".

Following the Vector-Space Model (VSM) the document view is transformed into a vector: $v(d)=(t_i,w_i)$, where the term $t_i$ is (attribute, keyword) and the term $w_i$ is the frequency of term $t_i$ in the document. Selected documents yield terms with positive weights, and unselected documents with negative weights. For all selected and unselected documents, their vectors are merged by summing up weights for equivalent attribute-keyword pairs so as to obtain a relevance term vector $L=(t_i,w_i)$, that is ordered by the decreasing values of weights.

For each unmarked document d, the similar representation $v(d)=\{(t_i, v_i)\}$ is extracted. The rank of the document with respect to the relevance term vector L can be evaluated in a standard way, for example, by the cosine formula:

$$Rel(d, L) = \frac{\sum w_i v_i}{\sqrt{\sum v_i^2 \sum w_i^2}}.$$

FIG. 3 shows an example of a re-ranked list of query answers 304 following the above-indicated manner of considering user feedback to compute a relevance score 306.

E. Query Refinement

The above described query-less feedback analysis performed at 226 and 218 can be further complemented with feedback proposing refinements for a query. In this embodiment, results are analyzed using session history and/or results from silent query analysis (at 228). The output of this analysis is used to propose refinements to the query (at 230) that the user can use to reformulate the query (at 232).

Proposed refinements to the query are based on the content of answer items and on relevance feedback. The general approach consists in suggesting refinements to the query that constrain results of a query to documents that contain terms from selected documents and that do not contain terms from unselected documents.

Thus, it is possible to analyze the user feedback, indicated in FIG. 3 by a "+" sign for positive feedback (for a selected document), and a "−" sign for negative feedback (for an unselected document), and determine how many selected documents have been provided by each interrogated source, and to eliminate those information sources which have provided a number of unselected documents above a predetermined threshold.

Additionally, the meta-search engine 104 can induce that some constraints of the original query can be relaxed or removed. Here, the proposed query refinement can be considered as a machine-learning problem, where the hypotheses are generated about queries and the training examples come as source answers.

Principally, there are two operational choices when applying meta-search engine query refinement with further querying. The first choice imposes that any refined query remains a real meta-searcher query, which is in the form (B, L), where "B" is the Boolean attribute query and "L" is the list of selected sources that will be interrogated by the meta-search engine.

With the second choice, the refinement query does not consider the initial query as one meta-search query any longer, but rather as a set of independent source queries having one query per selected source. Indeed, during this refinement, the source queries are iterated independently and any source query can be modified regardless how other source queries change.

Clearly, each choice provides specific advantages. With the first choice, the existing query processing does not change, but a better user satisfaction is more likely obtained with the second choice, since each source is treated in the optimal way. The first choice is discussed in more detail in section E.2 and the second choice in Section E.1 below.

E.1 Refining Independent Source Queries

In order to propose refinements to a query, it is assumed that a user has submitted a query Q. Its translation into the information source Sc's format produces the subsumed query Q. After a source returns a raw answer list $A_s$ in response to the subsumed query $Q_s$, the post-filtering of the raw answer list $A_s$ produces a list A identifying the final list of answers from the information source Sc. It is then assumed that the user selects a set "S+" of relevant items and/or documents and unselects a set "S−" of irrelevant items/documents from the list A. Each document is given by a set of pairs $t_i=$(attribute, keyword) and their corresponding weights $w_i$.

The manner in which the refinement of independent source queries will take place depends on the model used by the interrogated source. That is, whether an information source uses the Vector-Space Model (VSM) or the Enhanced Boolean Model (EBM) different query refinement will take place.

E.1.A Sources with Vector-Space Model

Figure 4A:
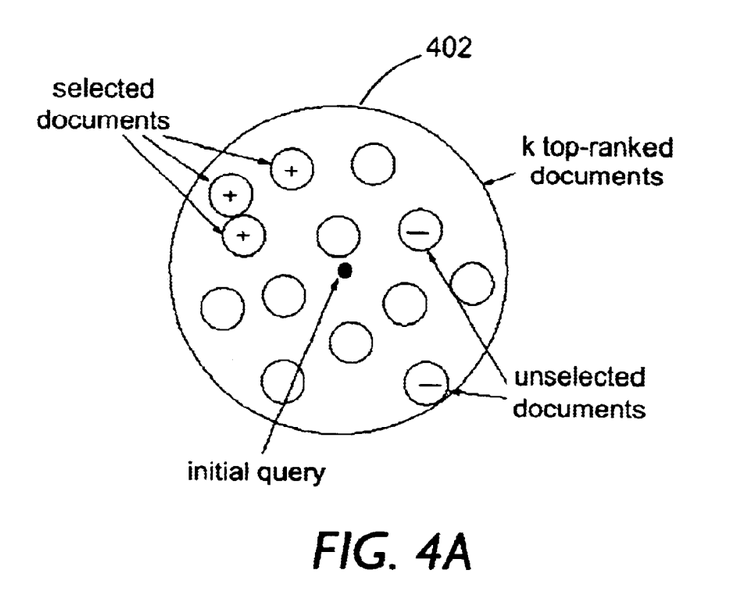
FIGS. 4A–4B schematically illustrate a query refinement for a vector-space model (VSM) using an independent source query.
Figure 4B:
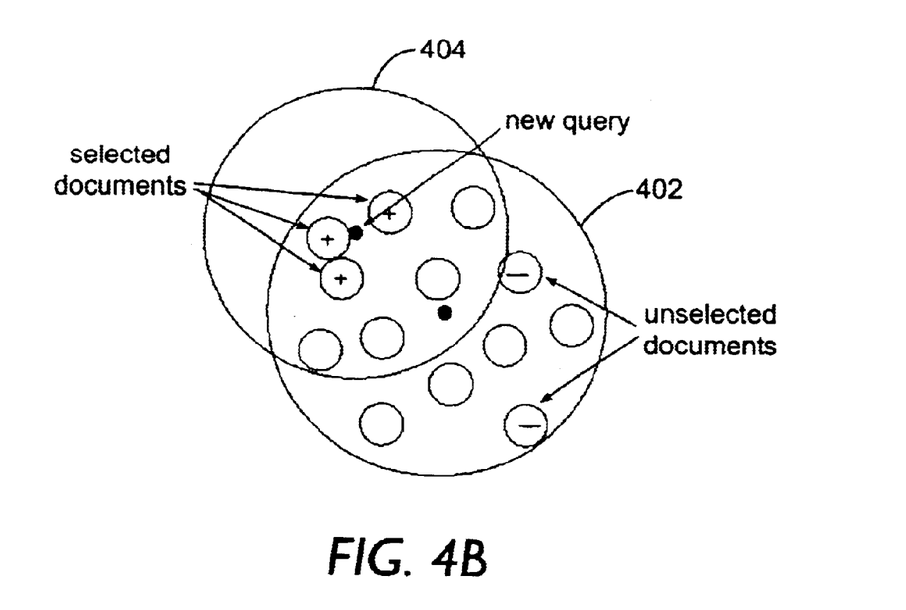

FIGS. 4A–4B shows a query refinement using the Vector-Space Model (VSM) using the independent source query. As shown in FIG. 4A, those documents which have a distance (or vector distance) that is longer than a predetermined distance to an initial query point are eliminated. The initial query is then refined by considering only those documents that have a distance that is shorter than the predetermined distance to the initial query point.

More specifically, the documents returned from an initial query are ranked by their "distance" to the initial query, as schematically depicted in FIG. 4A. The initial query is defined as a point in a multi-dimensional space and the circle 402 around it represents the k-closest or top-ranked documents (in a certain distance metric) from the repository, not all necessarily fitting the initial query Q.

The query refinement is performed by submitting the entire item relevance list as a conjunction, where query terms with negative weights are negated. FIG. 4B shows an example of refinement in which negative weighted documents are eliminated so as to improve the relevance of the answers of the new query that has the circle 404 around it in which the selected documents are included but the unselected documents are not.

E.1.B Sources with Enhanced Boolean Model

Figure 5A:
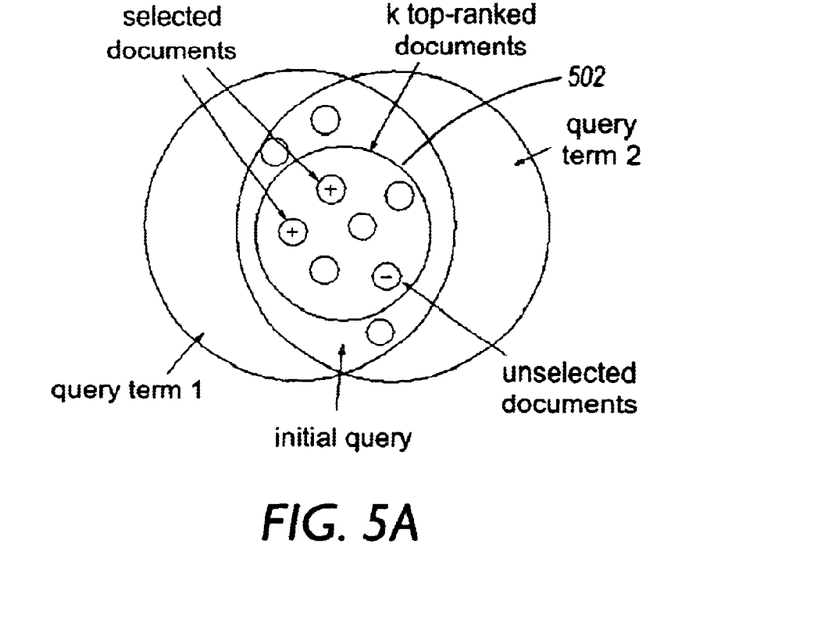
FIGS. 5A–5B schematically illustrate a query refinement for an enhanced Boolean model (EBM) using an independent source query.
Figure 5B:
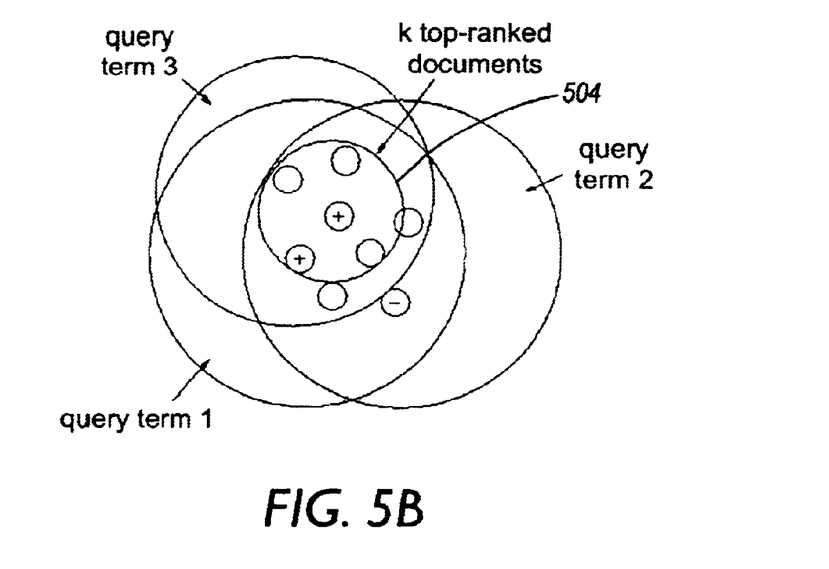

As shown schematically in FIGS. 5A–5B for sources using the Enhanced Boolean Model (EBM), the situation is somewhat different than for sources using the Vector-Space Model (VSM) shown in FIGS. 4A–4B. As shown in FIG. 5A, the circle 502 identifies a set of k top-ranked documents that satisfy the query terms 1 and 2. In FIG. 5B, which shows the refinement results, the original query terms 1 and 2 are padded with an additional query term 3 (or more terms if necessary) to make the search more selective as indicated by the circle 504 identifying the new set of k top-ranked documents. The selection of the additional query term 3 can be made on the basis of user relevance feedback. The padding strategy used to refine the results can vary from an aggressive strategy to a weak strategy.

In a weak strategy, the source query is constrained with a union of additional query terms $t_1$–$t_p$, as follows:

$$Q_{refined} = Q \text{ AND } (t_1 \text{ OR } t_2 \text{ OR } \ldots \text{ OR } t_p).$$

In an aggressive strategy, the original query is constrained with the intersection of additional query terms $t_1$–$t_r$, as follows:

$$Q_{refined} = Q \text{ AND } t_1 \text{ AND } \ldots \text{ AND } t_r.$$

The amount of the feedback is measured and used in order to determine how aggressive the constraining strategy should be. The more feedback provided by the user, the more aggressive a strategy could be used to reshape a query.

E.1.C Additional Considerations

In addition to the padding strategy, there are several important parameters that also influence query refinement. When representing each document by a vector of $(t_i, w_i)$ pairs, as discussed above, selected documents in the user feedback have positive weights and unselected documents have negative weights. Using this representation, terms can be sorted by weights and the initial query terms can be excluded, so that the resulting vector will begin with terms of the highest priority for constraining the query. If a term "t" has a positive weight, it is very likely that the term "t" should appear in the relevant documents and the query $Q_p$ should be constrained with the term t (i.e., $Q_p$ AND t).

As already explained above, query subsumption should also be taken into account to further improve query refinement, because not every attribute present in the answer tuple may be used in a query (i.e., understood in an interrogated source's query language). For example, assume that the term ((title, java), 3) is found to be the most valuable for query refinement. Thus, as compared to the operator subsumption explained above, in the above example, the operator here is "contains" (or: "equal to"), and the attribute is "title".

However, if a source "Sc" cannot query document titles, but only full-text, then the attribute needs to be changed from "title" to "full-text", with the operator staying the same (i.e., the attribute term should be subsumed with the query) (e.g., full-text contains java). As it may be understood, this may lead to different refinement results since the post-filtering can remove multiple documents and the refined query can be different from what one would expect to have. Naturally, in this example, the number of results may be much higher.

Therefore, the facilities provided by the source query language should also be taken into consideration so as to modify the selection of most valuable terms for query refinement accordingly. Each term in the list that will have an influence on the answers should be additionally weighted with a "translation coefficient". For an attribute "a" provided by an information source Sc, an attribute subsumption ratio r(a) may be estimated during post-filtering. If the term (a, keyword) is subsumed with the term (b, keyword), k items are returned and k' items remain after post-filtering, then the ratio k'/k gives the coefficient for this particular subsumption. The coefficient r(a) is given by the average value (i.e., mean value) over all subsumptions of attribute "a" with "b".

Once the coefficient r(a) has been determined for each attribute "a" of source Sc, the terms in the relevance list L are updated as follows. Each tuple ((a, keyword), x) is replaced with ((a, keyword), x*r(a)), then all terms are again reordered by decreasing weight values.

Finally, the user feedback can change the number k of answers requested from an information source. This is valid both for VSM and EBM sources. An initial value of k for a given source can increase or decrease if the user feedback about the source's answers is positive or negative. How sharply the parameter k changes will also depend on the amount of the user feedback.

It is thus possible to determine a source relevance ratio by analyzing the user feedback and the term relevance list "L" from selected and unselected documents and by comparing the documents provided by an interrogated source with the term relevance list.

Further, this allows refining the search by eliminating those sources whose relevance ratio is below a predetermined threshold value.

E.2 Refining Meta-Search Queries

Instead of interrogating each information sources independently through independent source query refinement, which should provide optimum results, queries may also be refined by refining meta-search queries. Instead of creating queries for each independent source, it may be useful to preserve the structure of the meta-search query and keep the form (B, L), where "B" is the Boolean attribute query and "L" is the list of sources "Sc" to be queried. In this embodiment, a user may have grown used to the meta-search engine, and does not necessarily feel capable of efficiently searching more than one or two sources individually.

According to this embodiment, once individual source queries have been refined as set forth above, a refined meta-search query is determined as follows. First, each information source "Sc" of the list L is tested to determine whether to keep it in the list L. An information source Sc remains in the list L if the user relevance feedback favors the answers returned from the information source, otherwise the source is excluded from the list. In addition, the source relevance ratios discussed above may be used here in this determination. Second, the Boolean attribute query B is refined by adopting the most representative change that is an average over all independent source queries as explained above with respect to independent source queries.

F. Learning Relevant Results

In order to find relevant documents, a user may refine an initial query many times with the aid of proposed refinements from the query reformulation module 154, until the user is satisfied with the search results. Because any new refinement should bring the user closer to the desired answer set and, the query reformulation module 154 can learn from the history of previous refinements recorded by the query history module 152 so as to induce new refinements that may be proposed. Although only a method for learning is presented below for the case in which information sources use the Vector-Space Model (VSM), it will be appreciated, however, that the method may be adapted to the Enhanced Boolean Model (EBM) in a similar manner.

According to the method, each query refinement is given by a term relevance list $L_i$, and query $Q_i$, which refines query $Q_{i-1}$ with respect to list $L_i$. For a new query refinement, given by the sets of selected and unselected documents $S^+_{i+1}$ and $S^+_{i+1}$, there is provided a term relevance list $L_{i+1}$. As mentioned above with respect to user feedback, the query refinement can be contradictory and it does not exclude cases when the user changes his or her opinion and unselects a document previously selected as relevant, or vise versa. The system can resolve such conflicts by assigning a higher priority to more recent selections and unselections. In the following discussion, it is assumed that the history of a number "m" recent refinements is used for a new refinement. The new refinement is accompanied by the down-weighting of previous term relevance lists $L_{i-1}$, $L_{i-1}$, ... $L_{i-n}$. An accumulated relevance vector $LA_i$ can then be determined as follows:

$$LA_i = \sum_{j=1}^{m} L_{i+1-j} z^j,$$

where z is a down-weighting coefficient, and

L is a term relevance list.

Figure 6A:
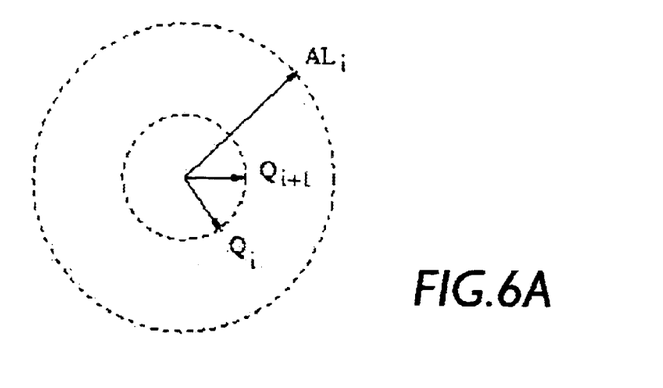
FIGS. 6A–6C schematically illustrate correlations between successive queries and an accumulated relevance vector.
Figure 6B:
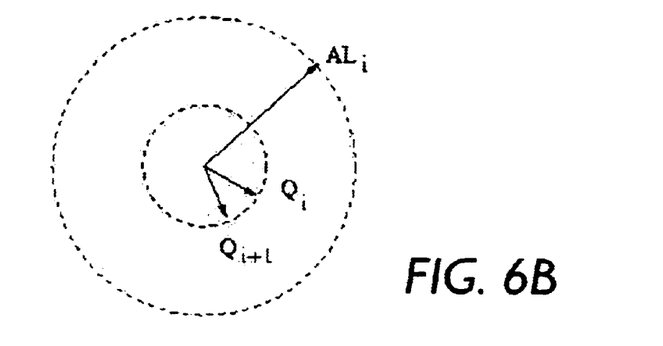
Figure 6C:
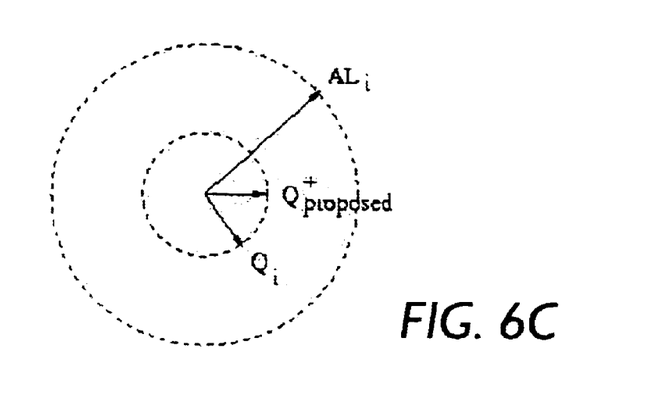

Generally, all queries, whether generated by users or proposed by the system, are short (i.e., just a few terms in length) and the term relevance lists $L_i$ are usually much longer. Using the Vector Space Model, the query vector $Q_i$ is represented by a "short" vector and the accumulated relevance vector $AL_i$ is represented by a "long" vector. FIGS. 6A–6C schematically show the correlations between successive "short" query vectors (e.g., $Q_i$, $Q_{i+1}$, ...) and the "long" accumulated relevance vector $AL_i$.

The relationships among successive query vectors $Q_i$, and $Q_{i+1}$ and accumulated relevance vectors $AL_i$, form the main part of the learning mechanism that evaluates the correlation between $Q_i$, $AL_i$, and $Q_{i+1}$. The correlation is considered positive, if $Q_{i+1}$ "tends" from $Q_i$ to $AL_i$ as shown in FIG. 6A. Otherwise, if $Q_{i+1}$ moves further away from $AL_i$, as shown in FIG. 6B, the correlation is considered negative. Using the observation of past correlations, the query reformulation module 162 can thus propose a corresponding query refinement $Q^+_{proposed}$, as shown in FIG. 6C, that tends towards the accumulated relevance vector $AL_i$.

In addition to this correlation analysis, the proposed refinement may include an estimation of eventual subsumption ratios in order to minimize the amount of post-filtered documents.

G. Miscellaneous

To recapitulate, as shown in FIG. 2 at 200, a user formulates a query which can be input into the meta-search engine 104, generally implemented as a software program running on a computer system. The meta-search engine 104 plans and executes the query in line with the formulation by the user. This means that information sources 108, usually available on the Internet, are interrogated so as to try to find if their document databases contain documents relevant to the query. If so, summaries of such documents are retrieved at 213, and displayed to the user at computer 102 as a list of selectable documents communicating with (or running integrally with) the meta-search engine 104.

Before being displayed to the user, the list of documents may be ranked at 218, or may be filtered at 214 as explained above to remove irrelevant documents. If an operator is identified as having a low subsumption ratio at 216, the meta-search engine 104 could propose refinements to such an operator by another one at 228 and 230 and the user could re-submit the reformulated query at 232 so as to improve the relevance of the result.

The user can provide explicit or implicit feedback at 224 by selecting and deselecting results viewed at 222, and the meta-search engine 104 will re-rank the results in view of the user feedback at 226 and 218. In addition, a refined query may be reformulated and proposed to the user at 228 using user relevance feedback and session history to obtain a refined answer list.

Using the foregoing specification, the invention may be implemented as a machine (or system), process (or method), or article of manufacture by using standard programming and/or engineering techniques to produce programming software, firmware, hardware, or any combination thereof.

Any resulting program(s), having computer-readable program code, may be embodied within one or more computer-usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer-usable medium such as on any memory device or in any transmitting device.

Executing program code directly from one medium, storing program code onto a medium, copying the code from one medium to another medium, transmitting the code using a transmitting device, or other equivalent acts may involve the use of a memory or transmitting device which only embodies program code transitorily as a preliminary or final step in making, using, or selling the invention.

Memory devices include, but are not limited to, fixed (hard) disk drives, floppy disks (or diskettes), optical disks, magnetic tape, semiconductor memories such as RAM, ROM, Proms, etc. Transmitting devices include, but are not limited to, the Internet, intranets, electronic bulletin board and message/note exchanges, telephone/modem based network communication, hard-wired/cabled communication network, cellular communication, radio wave communication, satellite communication, and other stationary or mobile network systems/communication links.

A machine embodying the invention may involve one or more processing systems including, but not limited to, CPU, memory/storage devices, communication links, communication/transmitting devices, servers, I/O devices, or any subcomponents or individual parts of one or more processing systems, including software, firmware, hardware, or any combination or subcombination thereof, which embody the invention as set forth in the claims.

It will be appreciated that various other alternatives, modifications, variations, improvements or other such equivalents of the teachings herein that may be presently unforeseen, unappreciated or subsequently made by others are also intended to be encompassed by the following claims.

What is claimed is:

1. A method for improving search results from a meta-search engine that queries information sources containing document collections, comprising:

receiving an original query with user selected keywords and user selected operators; the user selected operators defining relationships between the user selected keywords;

identifying a set of information sources to be interrogated using the original query by performing one of: (a) receiving a set of user selected information sources, (b)

automatically identifying a set of information sources, and (c) performing a combination of (a) and (b); the set of information sources identifying two or more information sources;

translating at least one of the user selected operators of the original query that is not supported by one of the information sources in the set of information sources to an alternate operator that is supported by the one of the information sources in the set of information sources;

submitting a selected one of the translated queries and the original query to each information source in the set of information sources;

receiving answers from each information source for the query submitted thereto;

filtering each set of answers received from each information source that satisfy one of the translated queries by removing the answers that do not satisfy the original query;

for each filtered set of answers, computing a subsumption ratio of the number of filtered answers that satisfy the original query to the number of answers that satisfy the translated query; and using each computed subsumption ratio to perform one of: (d) reformulating a translated query; (e) modifying information sources in the set of information sources automatically identified at (b); and (f) performing a combination of (d) and (e).

2. The method according to claim 1, further comprising:

providing to the user the answers from the set of information sources as a list of selectable document summaries;

requesting the user to provide positive feedback and negative feedback to documents in the list of selectable document summaries;

receiving feedback for at least one document in the list of document summaries;

computing document relevance for documents in the list of document summaries by performing one of: (g) decreasing the relevance of a document with terms forming part of documents given negative feedback by the user that do not appear in documents given positive feedback by the user; (h) increasing the relevance of a document with terms that form part of documents given positive feedback by the user; and (i) a combination of (g) and (h); and providing to the user the answers ranked according to the computed document relevance.

3. The method according to claim 2, further comprising:

refining at least one of the translated queries by performing one of: (j) eliminating terms forming part of documents given negative feedback by the user that do not appear in documents given positive feedback by the user; (k) adding terms not in the query that form part of documents given positive feedback by the user; and (l) a combination of (j) and (k);

proposing to the user the refined query.

4. The method according to claim 1, further comprising:

providing to the user the answers from the set of information sources as a list of selectable document summaries;

requesting the user to provide positive feedback and negative feedback to documents in the list of selectable document summaries;

receiving feedback for at least one document in the list of document summaries;

refining at least one of the translated queries by performing one of: (g) eliminating terms forming part of documents given negative feedback by the user that do not appear in documents given positive feedback by the user; (h) adding terms not in the query that form part of documents given positive feedback by the user; and (i) a combination of (g) and (h); and proposing to the user the refined query.

5. The method according to claim 1, wherein said translating further comprises substituting an operator O that is not supported, by an information source in the set of information sources, with at least one supported operator O' that provides substantially similar answers as the operator O.

6. The method according to claim 5, wherein said computing computes an operator subsumption ratio $r(O,O')$ of the number of filtered answers S and the number of answers S' received that satisfy the translated query as follows:

$$r(O,O')=|S|/|S'|,$$

wherein the operator O is substituted with another supported operator O" when the operator subsumption ratio $r(O,O')$ is less than a predetermined threshold value.

7. The method according to claim 5, wherein said computing computes a query subsumption ratio $r(Q)$ of the number of filtered answers S and the number of answers received S' that satisfy the translated query as follows:

$$r(Q)=|S|/|S'|,$$

wherein the translated query is reformulated when the query subsumption ratio $r(Q)$ is less than a predetermined threshold value, where Q is a query that contains a set of operators $O_1, O_2, \ldots O_n$.

8. The method according to claim 1, further comprising:

providing the user the answers as a list of selectable document summaries in response to receiving the original query;

analyzing input received from the user in response to the providing the list of selectable document summaries; said analyzing detecting if the user selects a document, unselects a document, or does not select or unselect a document;

assigning a positive weight to terms in selected documents and a negative weight to terms in unselected documents;

ranking the result by ordering the most relevant documents with the highest positive weight to the least relevant documents with the highest negative weight; and providing the user the ranked list of results.

9. The method according to claim 8, further comprises:

disregarding all documents from the list that have not been selected by the user;

refining a translated query by eliminating terms from unselected documents which do not appear in selected documents and by adding terms that do appear in selected documents; and proposing the refined query to the user.

10. The method according to claim 9, wherein the method further comprises:

determining a term relevance list (L) from selected and unselected documents;

determining a source relevance ratio by comparing the documents provided by an interrogated source with the term relevance list (L); and eliminating those sources with a relevance ratio below a predetermined threshold value.

11. The method according to claim 10, wherein said proposing the refined query is performed by proposing one of a meta-search query and a set of independent queries to each source.

12. The method according to claim 11, the method further comprises for information sources that use a Vector-Space Model:
- determining a first distance for each answer in the answer list with respect to the query; the query being represented as a point in a multi-dimensional space;
- eliminating those documents which have a distance that is greater than a predetermined distance to the query point; and
- refining the query by considering terms those documents which have a distance that is less than the predetermined distance to the query point.

13. The method according to claim 11, the method further comprises for information sources that use an Enhanced Boolean Model:
- adding at least one additional query term to the original query in order to make the query more selective; the additional terms being identified using the input received from the user for documents in the list of selectable document summaries.

14. The method according to claim 8, further comprising:
- analyzing user actions on the documents in the list of selectable document summaries;
- recording information about the user and about the user's interaction with the list of selectable document summaries;
- computing correlation information between a previous query and a refined query relative to the information recorded about the user; and
- proposing refinements in a successive query using the correlation information.

15. A meta-search engine, comprising:
- an automatic source selection module for receiving an original query with user selected keywords and user selected operators; the user selected operators defining relationships between the user selected keywords; the automatic source selection module identifying a set of information sources to be interrogated using the original query by performing one of: (a) receiving a set of user selected information sources, (b) automatically identifying a set of information sources, and (c) performing a combination of (a) and (b); the set of information sources identifying two or more information sources;
- a query translation module for translating at least one of the user selected operators of the original query that is not supported by one of the information sources in the set of information sources to an alternate operator that is supported by the one of the information sources in the set of information sources; the query translation module submitting a selected one of the translated queries and the original query to each information source in the set of information sources,
- a query filtering module for receiving answers from each information source for the query submitted thereto by the query translation module; the query filtering module filtering each set of answers received from each information source that satisfy one of the translated queries by removing the answers that do not satisfy the original query;
- a silent query analyzer for computing a subsumption ratio for each set of answers filtered by the query filtering module; the subsumption ratio being a ratio of the number of filtered answers that satisfy the original query to the number of answers that satisfy the translated query; and
- a query reformulation module for using each subsumption ratio computed by the silent query analyzer to perform one of: (d) reformulating a translated query; (e) modifying information sources in the set of information sources automatically identified by the automatic source selection module; and (f) performing a combination of (d) and (e).

16. The meta-search engine according to claim 15, further comprising:
- a result ranking module for providing to the user the answers from the set of information sources as a list of selectable document summaries;
- a feedback module for requesting the user to provide positive feedback and negative feedback to documents in the list of selectable document summaries provided by the result ranking module;
- a schema evaluation module for receiving feedback for at least one document in the list of document summaries provided by the result ranking module; the schema evaluation module computing document relevance for documents in the list of document summaries by performing one of: (g) decreasing the relevance of a document with terms forming part of documents given negative feedback by the user that do not appear in documents given positive feedback by the user; (h) increasing the relevance of a document with terms that form part of documents given positive feedback by the user; and (i) a combination of (g) and (h); and
- where the result ranking module provides to the user the answers ranked according to the computed document relevance.

17. The meta-search engine according to claim 16, further comprising a query history module for learning reformulations made to the query; wherein the reformations made to the query are used by the query reformation module to propose additional reformation to the query.

18. The meta-search engine according to claim 15, wherein the query reformation module substitutes an operator O that is not supported, by an information source in the set of information sources, with at least one supported operator O' that provides substantially similar answers as the operator O.

19. The meta-search engine according to claim 18, the silent query analyzer computes an operator subsumption ratio $r(O,O')$ of the number of filtered answers S and the number of answers received that satisfy the translated query S' as follows:

$$r(O,O')=|S|/|S'|,$$

wherein the query reformulation module substitutes the operator O with another supported operator O" when the operator subsumption ratio $r(O,O')$ is less than a predetermined threshold value.

20. The meta-search engine according to claim 18, the silent query analyzer computes a query subsumption ratio $r(Q)$ of the number of filtered answers S and the number of answers received that satisfy the translated query S' as follows:

$$r(Q)=\Sigma|S|/\Sigma|S'|,$$

wherein the query reformulation module reformulates the translated query when the query subsumption ratio r(Q) is less than a predetermined threshold value.

21. An article of manufacture for use in a machine comprising:

a) a memory;

b) instructions stored in the memory for a method for improving search results from a meta-search engine that queries information sources containing document collections, the instructions being machine readable, the method comprising:

receiving an original query with user selected keywords and user selected operators; the user selected operators defining relationships between the user selected keywords;

identifying a set of information sources to be interrogated using the original query by performing one of: (a) receiving a set of user selected information sources, (b) automatically identifying a set of information sources, and (c) performing a combination of (a) and (b); the set of information sources identifying two or more information sources;

translating at least one of the user selected operators of the original query that is not supported by one of the information sources in the set of information sources to an alternate operator that is supported by the one of the information sources in the set of information sources;

submitting a selected one of the translated queries and the original query to each information source in the set of information sources;

receiving answers from each information source for the query submitted thereto;

filtering each set of answers received from each information source that satisfy one of the translated queries by removing the answers that do not satisfy the original query;

for each filtered set of answers, computing a subsumption ratio of the number of filtered answers that satisfy the original query to the number of answers that satisfy the translated query; and using each computed subsumption ratio to perform one of: (d) reformulating a translated query; (e) modifying information sources in the set of information sources automatically identified at (b); and (f) performing a combination of (d) and (e).

* * * * *